United States Patent [19]

Gahan

[11] Patent Number: 4,498,860
[45] Date of Patent: Feb. 12, 1985

[54] INJECTION MOLDING APPARATUS HAVING A SPRUE HOLDER WITH AN INCLINED RETRACTABLE RAM

[75] Inventor: Geoffrey D. Gahan, Great Missenden, England

[73] Assignee: Mouldmaking Design Centre Limited, Buckinghamshire, England

[21] Appl. No.: 518,277

[22] Filed: Jul. 28, 1983

[30] Foreign Application Priority Data

Aug. 6, 1982 [GB] United Kingdom ................. 8222794
May 11, 1983 [GB] United Kingdom ................. 8312935

[51] Int. Cl.³ ........................... B29F 1/03; B29F 1/05; B29D 27/00
[52] U.S. Cl. .................... 425/562; 264/45.5; 264/328.9; 264/DIG. 83; 425/566; 425/DIG. 51
[58] Field of Search ................... 264/DIG. 83, 328.9, 264/45.5; 425/DIG. 51, 562, 564, 566

[56] References Cited

U.S. PATENT DOCUMENTS

| | | | |
|---|---|---|---|
| 3,231,938 | 2/1966 | Seymour | 264/328.9 X |
| 3,436,446 | 4/1969 | Angell, Jr. | 264/DIG. 83 |
| 3,847,526 | 11/1974 | Fries | 425/DIG. 51 |
| 3,996,330 | 12/1976 | Jones et al. | 264/328.9 |
| 4,077,760 | 3/1978 | Sauer | 425/562 |
| 4,129,635 | 12/1978 | Yasuike et al. | 264/DIG. 83 |
| 4,255,368 | 3/1981 | Olabisi | 425/564 X |

Primary Examiner—Philip Anderson
Attorney, Agent, or Firm—Beveridge, DeGrandi & Kline

[57] ABSTRACT

A process of producing a moulding by introducing thermoplastics material into a mould space through gate means having a passageway, which process includes the formation of a sprue in the passageway. A retractable member cuts off the sprue before the material solidifies and closes the passageway at its junction with the mould space, the sprue being subsequently ejected from the passageway of the gate means before the next moulding cycle. A holder provides the gate means and the retractable member which is preferably inclined to the passageway. The gate means may also provide air ejecting means for removing the sprue and may conveniently be bolted onto an otherwise conventional injection moulding machine. The retractable member may incorporate a feed pipe for injecting a fluid into the plastics material.

12 Claims, 4 Drawing Figures

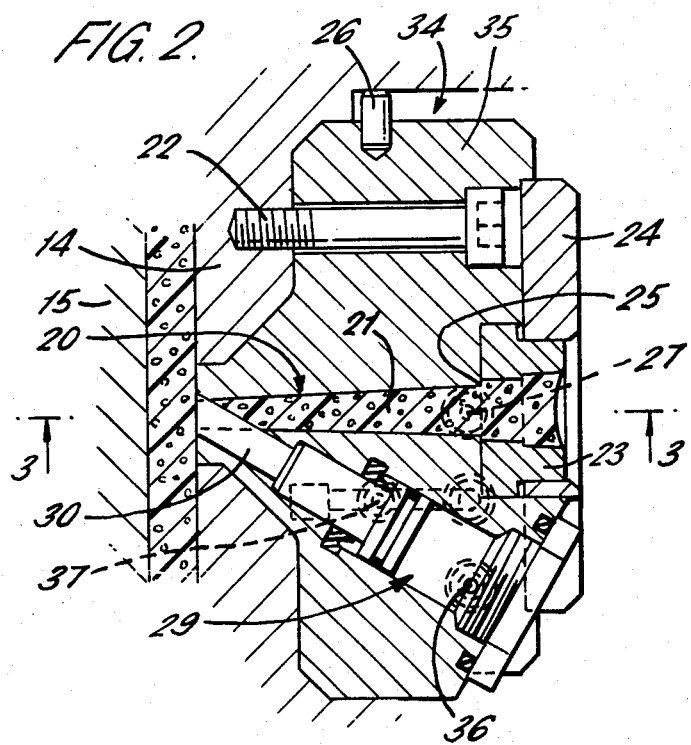
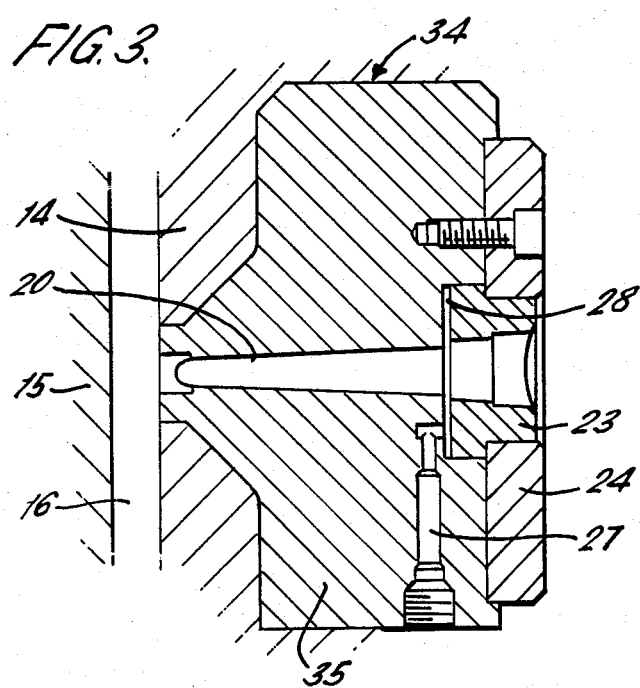

INJECTION MOLDING APPARATUS HAVING A SPRUE HOLDER WITH AN INCLINED RETRACTABLE RAM

BACKGROUND OF THE INVENTION

1. Field of the Invention

This invention relates to apparatus for producing thermoplastics mouldings.

2. Prior Art

It is known to produce structural foam plastics mouldings in a horizontally acting injection moulding machine. Commonly pellets of plastics material and a blowing agent are heated in a screw conveyor and fed to a nozzle for introduction into a mould space defined by a moulding tool mounted between a fixed platen and a movable platen operated by a hydraulic ram. Normally the viscous material is introduced through an axial passageway in the fixed platen. Within the passageway is formed a sprue which is integral with the moulding and which must subsequently be removed from the moulding in a finishing process before the moulding is painted. This finishing process necessitates the sprue being cut below the surface of the moulding leaving a recess which has to be filled and sanded. The finishing process is thus expensive and, in practice, cannot be performed immediately after moulding because of the tendency for the blowing agent to remain active for a considerable period of time. This intervening period can thus lead to a high loss rate of mouldings due to damage.

Known arrangements introduce the plastics material around or past a retractable core member which is then moved to close the passageway. In this case no sprue is formed which requires subsequent cutting. On the other hand, other problems are created since the material continually surrounding the core member has to be kept viscous and at the end of each moulding cycle there is created a solidified length of material which the core member thrusts into the mould space during the next cycle and which may spoil the resultant moulding.

The same applies both during the moulding of plastics material without a blowing agent, or alternatively the production of mouldings which require the injection of a fluid into the plastics moulding to create a pressurised mass therein which urges the plastics material into contact with the mould surfaces.

An object of the invention is thus to provide a moulding cycle which involves the formation of a sprue but which at least reduces the post-moulding treatment of the resultant moulding.

SUMMARY

According to the invention there is provided apparatus for producing a moulding by introducing thermoplastics material into a mould space through gate means having a passageway, which process includes the formation of a sprue in the passageway, characterised in that a retractable member cuts off the sprue before the material solidifies and closes the passageway at its junction with the mould space, the sprue being subsequently ejected from the passageway of the gate means before the next moulding cycle.

Preferably the sprue is ejected by air pressure. In this case the sprue is preferably formed with a peripheral shoulder against which the air acts.

The sprue may conveniently be ejected from the passageway of the gate means in the direction counter to the direction of flow of plastics material through the passageway.

In the production of a structural foam moulding plastics material and a blowing agent are introduced into the mould space.

Alternatively a fluid may be injected into the plastics material as it flows into the mould space for the purpose of creating at least one pressurised mass or porous core therein.

The invention also provides a holder for the sprue of an injection moulding machine, the holder comprising gate means having a passageway through which the material to be moulded is injected into the mould space and within which a sprue is formed and from which the sprue is ejected during each operating cycle, the passageway having an inlet end and an outlet end open to the mould space, and the gate means including a retractable member movable between a withdrawn position and a position in which the member closes the outlet end of the passageway, the member simultaneously cutting off the sprue from the moulding.

Preferably the passageway is axial of the injection moulding machine.

It is also preferred that the retractable member is a ram inclined to the passageway, and preferably a hydraulic ram.

The leading end of the retractable member is preferably shaped so that it forms a part of the wall of the mould space when the member is in its operative position.

Preferably the passageway is tapered outwardly in the direction of its inlet end to assist the ejection of the sprue at the end of the cycle in that direction. Within the gate means at the inlet end of the passageway there is preferably provided a bush which defines a counterbore for the passageway and which is movable axially of the passageway, whereby the sprue is formed with a peripheral shoulder facing towards the outlet end of the passageway.

Preferably the gate means includes means for supplying compressed air to the inner end of the bush, the air causing the bush to move outwardly relative to the passageway to form a gap beneath the shoulder of the sprue, the air then acting against the shoulder to eject the sprue from the holder.

The holder may include a feed pipe for injecting a fluid into the plastics material as it flows into the mould space.

In one embodiment the feed pipe extends into the passageway to a position at or adjacent the outlet end of the passageway. Alternatively the feed pipe may pass through the passageway to a position within the mould space.

If desired, the feed pipe may extend through the retractable member which is slidable thereon.

The invention further provides an injection moulding machine having a sprue holder as defined above.

BRIEF DESCRIPTION OF THE DRAWINGS

FIG. 2 is a sectional elevation of the holder of the moulding machine of FIG. 1 showing the retractable member in its extended position;

FIG. 3 is a section along line 3—3 in FIG. 2 to show the air ejection means for the sprue, the sprue having been ejected.

DESCRIPTION OF THE PREFERRED EMBODIMENTS

Figure 1:
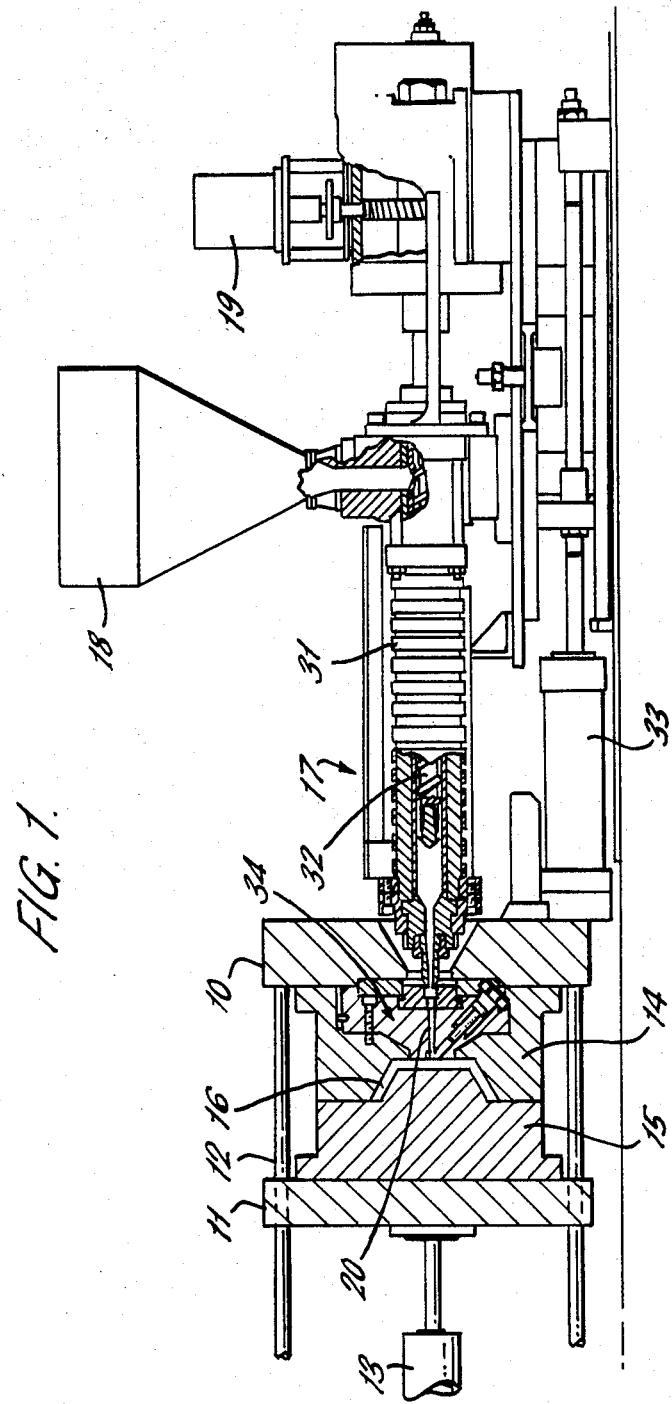
FIG. 1 is a diagrammatic sectional elevation, by way of example, of an injection moulding machine including a holder comprising gate means in which a sprue is formed and which includes a retractable member.

The embodiment of FIGS. 1 to 3 concerns the production of structural foam plastics mouldings. The injection moulding machine is a generally conventional structural foam moulding machine except for a modified holder or gate means which causes a sprue to be formed in the normal manner but which enables the sprue to be cut off the article being moulded before the moulding cycle is complete. The following description will thus concentrate on the sprue holder or gate means which allows the new moulding technique to be achieved.

Referring to FIG. 1, an injection moulding machine for articles of structural foam plastics material comprises a fixed platen 10 and a platen 11 movable horizontally towards and away from the fixed platen along guide rods 12 by a hydraulic ram 13. A moulding tool comprising two mating parts 14, 15 is mounted between the platens 10, 11 and the mould space 16 is fed with a mixture of thermoplastics material and a blowing agent by a screw conveyor 17. A hopper 18 supplies the conveyor 17 with the base material which is heated to the required viscous state in the conveyor by external heating elements in the form of bands 31. The screw 32 of the conveyor 17 is rotated by drive means 19, e.g. an electric or hydraulic motor, and a hydraulic ram 33 is provided for reciprocating the combined hopper and screw conveyor relative to the platens.

The material extruded by the conveyor 17 is fed to the mould space 16 through an axial passageway 20 in gate means 34 within which a sprue 21 is formed, the gate means thereby constituting a holder for the sprue. This holder or gate means 34 is shown in greater detail in FIGS. 2 and 3.

The gate means 34 is located relative to the adjacent female part 14 of the moulding tool by a detent 26 and is attached thereto by bolts 22, the outlet end of the injection passageway 20 being in direct communication with the mould space 16. The passageway 20 is tapered in an outward direction to allow ejection of the sprue away from the moulding tool at the end of the moulding cycle. The inlet end of the passageway 20 has a counterbore in which a bush 23 is located and held by a ring 24 bolted to the body 35 of the gate means. The counterbore allows a short axial movement of the bush 23 relative to the body 35 of the gate means, and the bore of the bush is designed to create a peripheral shoulder 25 on the sprue facing towards the outlet end of the passageway 20. For the purpose of achieving the ejection of the sprue, an air supply passageway 27 is open to the base of the counterbore of the passageway 20, the emission of air first moving the bush and sprue to open a gap 28, the pressure of the air against the shoulder 25 then causing the sprue to be ejected from the passageway 20.

The gate means 34 is also provided with a retractable member which, in this embodiment, is in the form of a hydraulic ram 29 supplied with oil through feed pipes 36, 37. The ram is inclined to the passageway 20 so that the direction of extension of the piston 30 of the ram intersects the passageway 20 at its outlet end. The end surface of the piston 30 is also shaped so that when the piston is extended (FIG. 2), the end of the piston closes off the passageway at its outlet end and the end surface forms a part of the outer wall of the mould space 16.

In operation, the piston 30 of the ram 29 is initially retracted (FIG. 1) whereby the passageway 20 is fully open for the introduction of the viscous mixture of plastics material and blowing agent from the conveyor 17 into the moulding space 16. The amount of mixture fills both the moulding space 16 and the passageway 20. The piston 30 is then extended to close off the outlet end of the passageway. This movement cuts off the sprue 21 and acts to push the short length of material which lies ahead of the piston 30 at the outlet end of the passageway into the mould space to amalgamate with the material already therein. The article being moulded is then formed and may be removed from the moulding tool in the normal manner. There is no sprue to be removed from the article in a costly finishing operation. Instead all that may be required is a light sanding of the article to remove any lines formed at the junction of the end surface of the piston and the surrounding portion of the moulding wall.

The sprue 21 is ejected by the air operated ejection means described above and the piston 30 of the ram 29 is retracted. The moulding cycle may then be repeated.

As mentioned above, in the moulding of articles of structural foam plastics material, it is found that the blowing agent which causes a "skin" to be formed on the outside surface of the article tends to remain active for a considerable period of time, i.e. a number of days, after the article is removed from the moulding tool. In the case of the above described embodiment, besides removing the sprue during the moulding operation, which reduces the unit cost and the likelihood of damage to the moulded article due to the inevitable delay if a finishing operation had been required, another advantage is that the natural skin is formed in the area where the sprue has been removed during the stage of continuing activity of the blowing agent after the end of the moulding cycle. Whilst the moulding machine described above is horizontally acting, the invention may also be applied to a moulding machine which operates vertically.

Also, instead of the plastics material and the blowing agent passing together along the screw conveyor 17, the blowing agent may be a fluid which is injected into the plastics material at the downstream end of the screw conveyor immediately prior to the introduction of the material through the gate means 34 into the moulded space 16.

Figure 4:
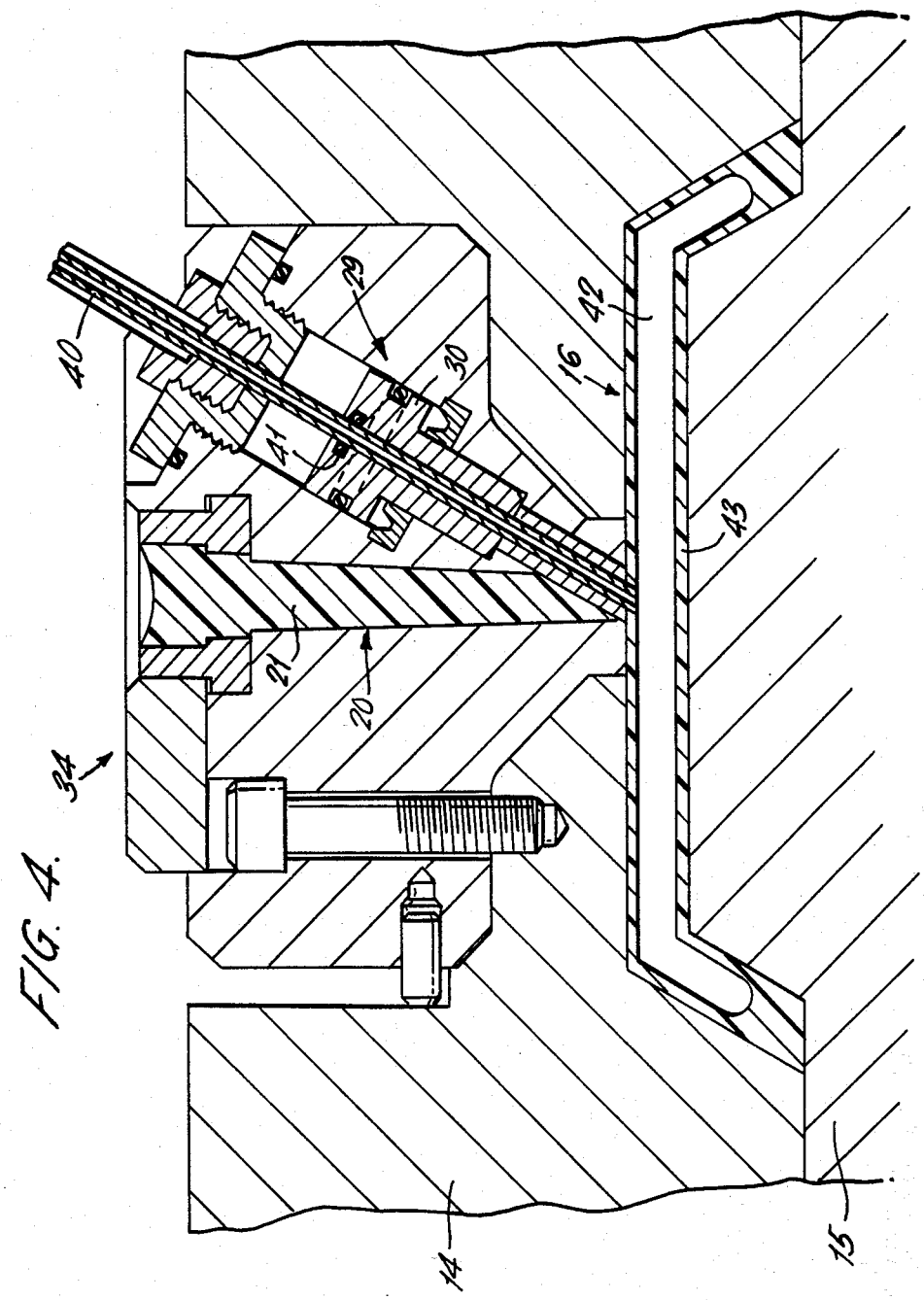
FIG. 4 is a view similar to FIG. 2 of the holder of another moulding machine, the holder incorporating a feed pipe for injecting a fluid into the plastics material.

Furthermore, the invention is applicable to the injection of a fluid under pressure into the plastics material in a manner in which the fluid flows with the plastics material through the mould space. In the case of the fluid being a blowing agent, it forms a porous core within a surrounding, non-porous wall of the plastics material the pressure within the porous core acting to urge the surrounding wall into contact with the mould surfaces to improve the surface definition. The same result is achieved when the fluid is not a blowing agent but injected into the plastics material to form a pressurised mass therein, the pressure being relieved before the mould is opened thereby resulting in a cavity within the moulding. An embodiment of the last arrangement is shown in FIG. 4 in which the fluid is injected through a pipe 40 which is coaxial with the ram 29 and has its outlet end within the mould space 16. Alternatively, the outlet end of the pipe 40 may be level with or even short of the end of the ram 29 when in its extended position. In operation the pipe 40 remains stationary and a seal 41 is provided between the piston 30 of the ram and the pipe, the piston sliding thereon during its extending and contracting movements. The pipe 40 and the ram 29 are entirely complementary since the presence of the pipe 40 does not affect the operation of the ram or the subsequent use of air pressure to eject the sprue, and nor does the ram affect the injection of fluid through the pipe during the filling of the mould space.

During the introduction of plastics material through the gate means 34 into the mould space 16, when the plastics material has immersed the end of the pipe 40, fluid, e.g. nitrogen, is injected from the pipe into the plastics material and flows with the plastics material through the mould space. The fluid thus forms a pressurised mass 42 which urges the surrounding wall of plastics material 43 towards the mould surfaces. When required the ram 29 is extended to cut off the sprue and the pressure of the mass 42 is relieved by the removal of fluid through the pipe 40. Subsequently the mould is opened and the sprue 21 is ejected. The resultant moulding has a small hole corresponding to the diameter of the pipe 40, which may be easily filled in known manner.

What I claim is:

1. A holder for the sprue of an injection moulding machine, the holder comprising gate means having a passageway through which the material to be moulded is injected into the moulding space and within which a sprue is formed and from which the sprue is ejected during each operating cycle, the passageway having an inlet end and an outlet end open to the mould space, and the gate means including a retractable ram inclined to the passageway, the ram being movable between a withdrawn position and a position in which the ram closes the outlet end of the passageway, the ram simultaneously cutting off the sprue from the moulding.

2. A holder as claimed in claim 1, wherein the passageway is axial of the injection moulding machine.

3. A holder as claimed in claim 1, wherein the ram is a hydraulic ram.

4. A holder as claimed in claim 1, wherein the leading end of the retractable ram is shaped so that it forms a part of the wall of the mould space when the ram is in its operative position.

5. A holder as claimed in claim 1, wherein the passageway is tapered outwardly in the direction of its inlet end to assist the ejection of the sprue at the end of the cycle in that direction.

6. A holder as claimed in claim 1, wherein within the gate means at the inlet end of the passageway there is provided a bush which defines a counterbore for the passageway and which is movable axially of the passageway, whereby the sprue is formed with a peripheral shoulder facing towards the outlet end of the passageway.

7. A holder as claimed in claim 6, wherein the gate means includes means for supplying compressed air to the inner end of the bush, the air causing the bush to move outwardly relative to the passageway to form a gap beneath the shoulder of the sprue, the air then acting against the shoulder to eject the sprue from the holder.

8. A holder as claimed in claim 1, including a feed pipe for injecting a fluid into the plastics material as it flows into the mould space.

9. A holder as claimed in claim 8, wherein the feed pipe extends into the passageway to a position at or adjacent the outlet end of the passageway.

10. A holder as claimed in claim 8, wherein the feed pipe passes through the passageway to a position within the mould space.

11. A holder as claimed in claim 8, wherein the feed pipe extends through the retractable ram which is slidable thereon.

12. An injection moulding machine having a sprue holder as claimed in claim 1.

* * * * *